United States Patent [19]
Salonen

[11] Patent Number: 5,269,262
[45] Date of Patent: Dec. 14, 1993

[54] COMBUSTION UNIT
[75] Inventor: Pasi Salonen, Orivesi, Finland
[73] Assignee: Tampella Power Oy, Tampere, Finland
[21] Appl. No.: 867,340
[22] Filed: Apr. 13, 1992
[30] Foreign Application Priority Data
Apr. 11, 1991 [FI] Finland .................. 911734
[51] Int. Cl.⁵ .............................. F22B 1/00
[52] U.S. Cl. .................. 122/4 D; 110/245; 165/104.16; 422/145; 422/146
[58] Field of Search ........... 122/4 D; 110/245; 165/104.16; 422/145, 146

[56] References Cited
U.S. PATENT DOCUMENTS
5,003,931 4/1991 Huschauer .............. 122/4 D
5,140,950 8/1992 Abdulally .............. 122/4 D Primary Examiner—Edward G. Favors
Attorney, Agent, or Firm—Pollock, Vande Sande & Priddy

[57] ABSTRACT

The invention relates to a combustion unit, which for effecting a circulating mass process comprises a reactor chamber, whose lower part is, for formation of a fluidized bed, fitted with a grate structure (10), at least one particle separator with means for purifying the combustion gas containing solid material, formed in the fluidized bed, from said solid material, and a return duct (6a) for returning the solid material particularly to the fluidized bed. A gas lock structure (KL) as an extension of the return duct (6a) prevents the gas flow to the opposite direction and comprises a combination formed by a closed bottom structure (14), a cover structure (11) placed above the bottom structure (14) and having openings (12a), an interspace (13) formed between the bottom structure (14) and the cover structure (11), and openings (15a) placed in the wall of the return duct (6a) between the bottom structure (14) and the cover structure (11), as seen in vertical direction, and connected with the interspace (13). The solid material moves from the return duct (6a) through the openings (12a) of the cover structure (11) to the interspace (13) and exits from the interspace (13) to the fluidized bed above the grate structure (10) through the openings (15a) of the return duct (6a).

14 Claims, 4 Drawing Sheets

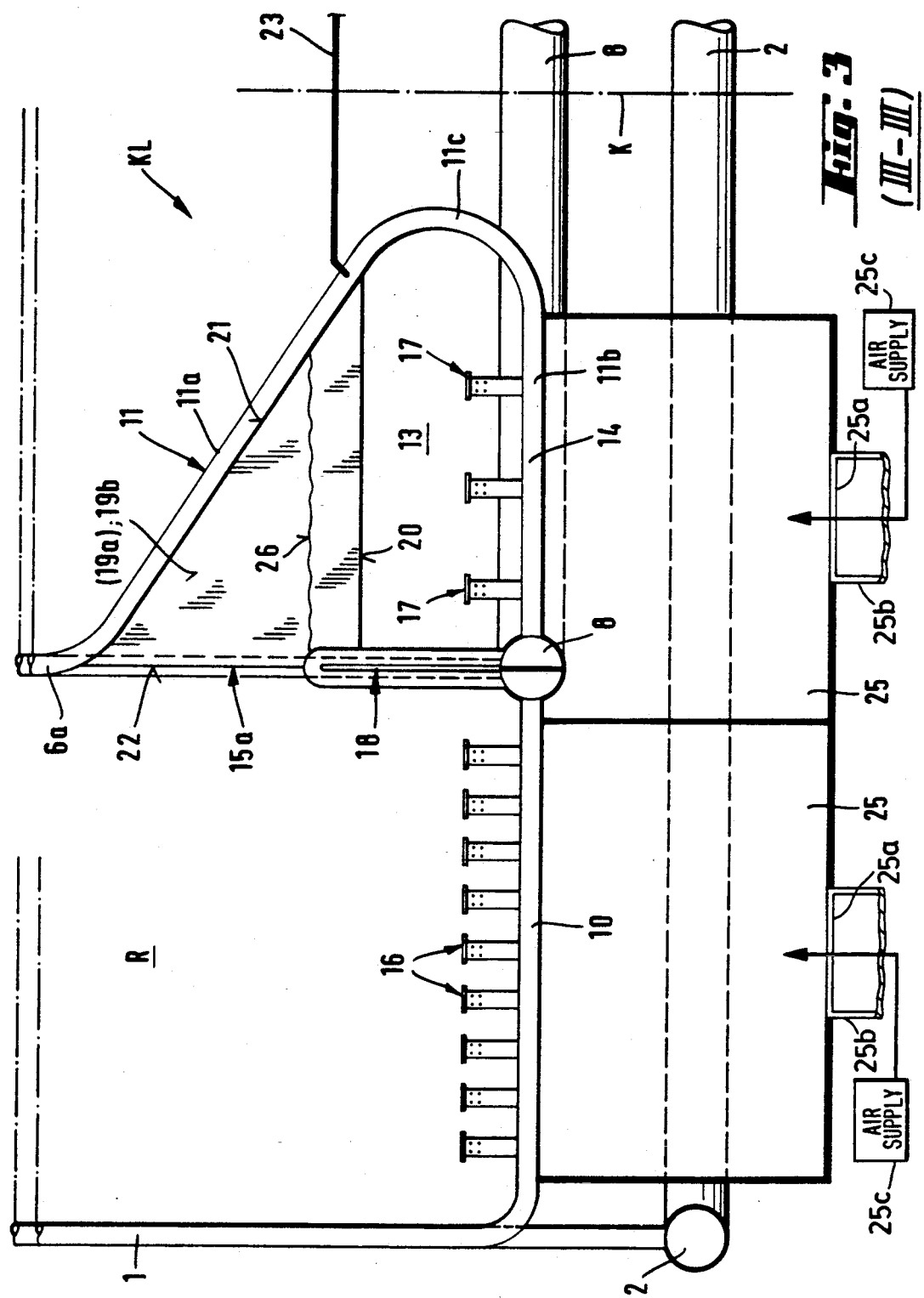

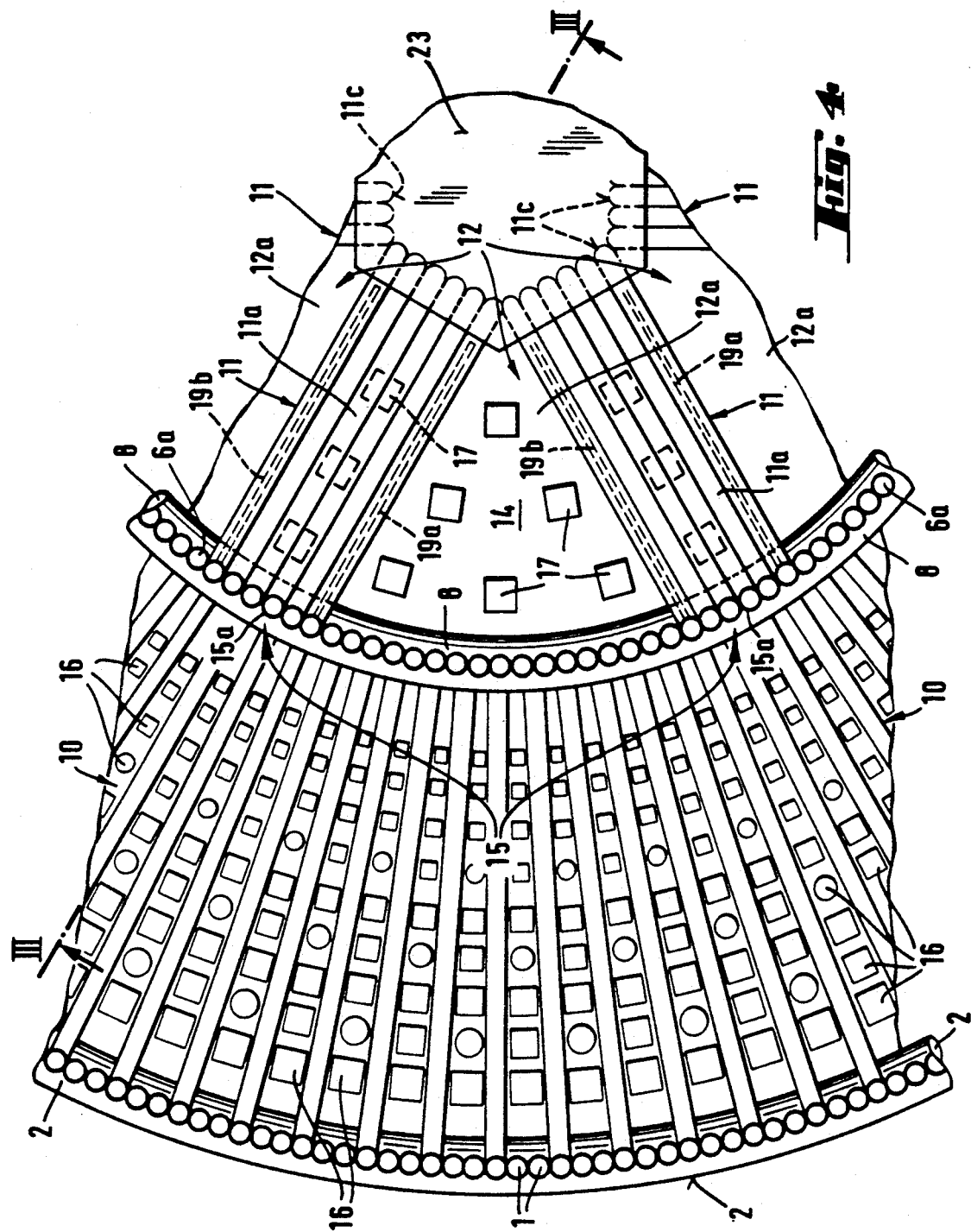

COMBUSTION UNIT

FIELD OF THE INVENTION

The invention relates to a combustion unit for effecting a circulating mass process. The combustion unit comprises a reactor chamber whose lower part is fitted with a grate structure for forming a fluidized bed. The grate structure comprises means for feeding fuel above the grate structure as well as means for feeding air also above the grate structure into the fluidized bed. Furthermore, the combustion unit comprises at least one particle separator with means for purifying the combustion gas containing solid material, formed in the fluidized bed, from the solid material, and a return duct for returning the solid material particularly to the fluidized bed. Further, the return duct is connected with a gas lock structure forming its extension to prevent the gas flow from the grate structure to the particle separator that tends to occur under certain process conditions.

BACKGROUND OF THE INVENTION

With regard to the conventional prior art, the U.S. Pat. No. 4,165,717 is referred to, which presents a circulating mass process with a particle separator located outside the furnace and with the return of solid material through a return duct to the lower part of the furnace. The return duct is not, however, equipped with a gas lock.

With regard to the prior art, further reference can be made to the publication F.A. Zenz, "Fluidization and Fluid-Particle Systems", Pemm-Corp Publications, Vol. II, Draft, 1989, pp. 333-334. This publication deals with a so-called bubbling fluidized bed reactor, in which the particle separator is placed inside the reactor chamber and the return duct for solid material is vertical and concentric with the joint center axis of the reactor chamber and the particle separator. The lower part of the return duct comprises a gas lock arrangement which is particularly described on page 334 of this publication. The gas lock arrangement comprises mechanical mobile parts, and consequently, it is extremely difficult to be constructed under the exact conditions of the reactor chamber. This fact naturally results also in that a gas lock arrangement of this type is very unreliable in function.

Moreover, with regard to the prior art, reference is made to U.S. Pat. No. 5,070,822 and European Patent Application Publication No. 440,552. Some other improvements in circulating mass process are presented in these prior publications that can be applied also in a combustion unit according to the present invention if necessary.

In brief, it can be stated on basis of the knowledge of the prior art that gas lock structures in the prior art have been unsatisfactory with regard to their structure as well as their function

SUMMARY OF THE INVENTION

The purpose of the present invention is therefore to present a combustion unit with a gas lock structure that meets the requirements of the circulating mass process and thus to raise the prior art in the field. The gas lock structure of a combustion unit according to the present invention is used to prevent under certain process conditions the gas flow from the grate structure to the particle separator that tends to occur and thus to prevent the malfunction of the particle separator, to improve the separating capacity of the particle separator and thus, naturally, to prevent a decrease in the efficiency of the process.

To attain the objects presented above, the combustion unit according to the invention is primarily characterized in that the gas lock structure comprises a closed bottom structure or the like, a cover structure or the like placed above the bottom structure or the like and equipped with an open area or the like, an interspace or the like formed between the bottom structure or the like and the cover structure or the like, and an open area or the like placed in the wall of the return duct between the bottom structure or the like and the cover structure or the like, as seen in vertical direction, and connected with the interspace or the like, whereby the solid material is arranged to move from the return duct through the open area or the like of the cover structure or the like to the interspace or the like and to exit from the interspace or the like to the fluidized bed above the grate structure through the open area or the like of the return duct.

The solution presented above provides the advantage that the interspace forms an efficient barrier to such a flow that under certain process conditions tends to take the opposite direction, that is from the fluidized bed to the particle separator. As the flow of solid material moves through the gas lock structure to the fluidized bed, it must change its direction at least once from an essentially vertical flow to a horizontal one.

According to one very advantageous embodiment, the open areas are formed of openings alternating in the direction of the periphery of the return duct in a way that at the location of the openings of the open area of the cover structure, the wall of the return duct is closed, and at the location of the parts forming the cover structure, the openings of the open area in the wall of the return duct are situated below the parts of the cover structure. This solution further extends the distance of traverse of the solid material from the return duct to the fluidized bed, whereby several flow changing points develop in the flow path of the solid material.

Further, according to another particularly advantageous embodiment, the combustion unit according to the invention is, to apply the principle of circulating fluid, realized in a way known from the U.S. Pat. No. 5,070,822, wherein the gas lock structure is arranged into the lower part of the return duct as an annular part extending towards the joint center line of the reaction chamber and the return duct.

Further, the gas lock structure according to the invention may advantageously comprise several structures having a substantial effect on the structure and function of the gas lock structure, such as air blow formed in the interspace, formation of the bottom structure and the cover structure at least partly of a bent tubular structure containing heat transfer medium, as well as vertical guard walls connected with the openings of the opening arrangement of the return duct, to mention some examples. These and some other advantageous embodiments of the gas lock structure according to the invention are described later.

The combustion unit according to the invention and its gas lock structure in particular will be further illustrated in the following description by referring to the embodiment presented in the enclosed drawings.

In the drawings

BRIEF DESCRIPTION OF THE DRAWINGS

FIG. 3 shows point III of FIG. 1 in a larger scale, and FIG. 4 shows the section IV—IV of FIG. 1 in a larger scale but so that only part of the gas lock structure and of the grate structure is illustrated.

DETAILED DESCRIPTION OF THE PREFERRED EMBODIMENT

Figure 1:
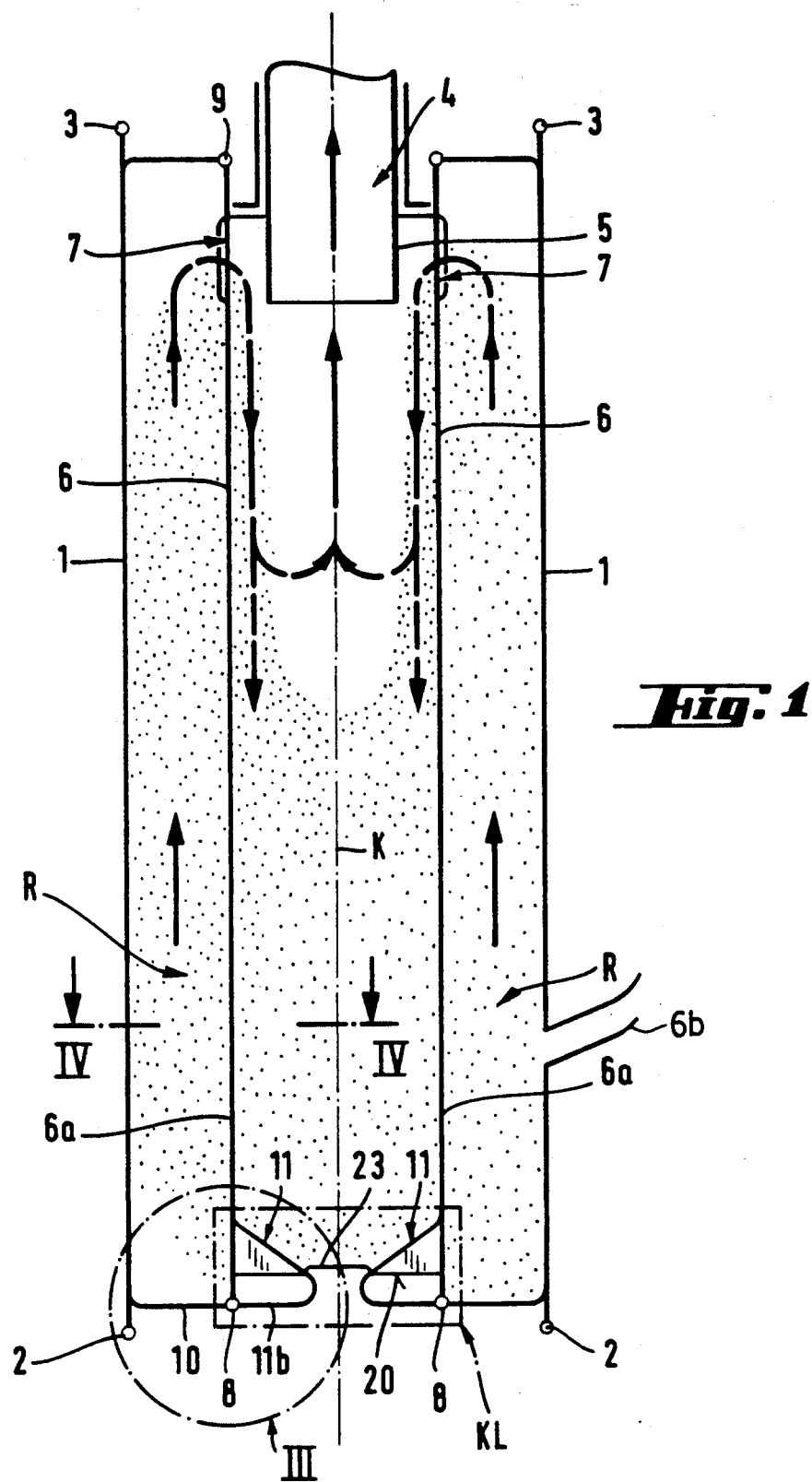
FIG. 1 shows a schematic view of the combustion unit in vertical section in which an embodiment of the gas lock structure according to the invention is placed in the lower part of the return duct.

The combustion unit for effecting a circulating mass process according to FIG. 1 comprises a reactor chamber R, which has a circular horizontal cross-section. The vertical outer wall structure 1 of the reactor chamber R is formed of a welded structure of a plurality of tubes containing heat transfer medium. The lower part of the structure contains an annular distributing chamber 2 for the heat transfer medium, and the upper part, correspondingly, contains an annular collecting chamber 3 for the heat transfer medium. A particle separator 4 is placed inside the upper part of the reactor chamber R. The particle separator comprises an inner vertical jacket tube 5 and an outer, also vertical, jacket tube 6, the upper part of which contains an inlet arrangement 7 for combustion gases. The vertical center lines of the jacket tubes 5 and 6 join the center line K of the reactor chamber. The extension of the outer jacket tube 6 also forms the return duct 6a for the solid material, extending continuously down to the lower part of the reactor chamber R where the gas lock structure according to present invention is situated, as outlined by the dash-and-dot line KL in FIG. 1. Fuel feeding means 6b are provided in connection with the wall structure of the reactor chamber in the same manner know in the prior art. In this embodiment, the outer jacket tube 6 and the return duct 6a are circular tubular structures that are circular in cross-section with equal radii. With regard to the structure of the particle separator, mainly formed by the members 5, 6 and 7, reference can be made in this connection to the U.S. Pat. No. 5,070,822, in which an advantageous alternative is presented for the structure of the particle separator. The outer jacket tube 6 as well as the return duct 6a can advantageously be made of a welded structure of a plurality of tubes containing heat transfer medium. Thus, the gas lock structure KL can essentially be connected to the same structure of tubes containing heat transfer medium. FIG. 1 shows an annular distributing chamber 8 for heat transfer medium in the lower part of the gas lock structure and, correspondingly, an annular collecting chamber 9 for heat transfer medium in the upper part of the reactor chamber, whereby the above-mentioned flow of heat transfer medium passes through the gas lock structure KL, the return duct 6a and the outer jacket tube 6. The grate structure 10 in the lower part of the reactor chamber can, in applicable parts, be similarly formed of a welded structure of a plurality of tubes containing heat transfer medium, whereby the flow of heat transfer medium can be arranged between the distributing chambers 2 and 8. Correspondingly, the cover structure of the reactor chamber can be formed of a welded structure of a plurality of tubes containing heat transfer medium, wherein the flow of heat transfer medium can pass between the tubes of the outer wall structure 1 of the reactor chamber R and the collecting chamber 9. As the flow arrangements of the heat transfer medium are not primarily involved in this invention, they are not described in more detail in this connection, but it will be understood that a man skilled in the art can, using his knowledge on heat transfer and welded structures of a plurality of tubes, design and construct the medium flows in the reactor chamber R as well as in other associated structures of a plurality of tubes containing heat transfer medium.

In the combustion unit according to FIG. 1, the circulating mass process is generated so that the gas/solid material separating from the fluidized bed developed above the annular grate structure 10 (see also FIG. 4) flows upwards to the upper part of the reactor chamber R in the vertical annular space limited by the outer wall structure of the reactor chamber R and by the return duct, and passes further to the particle separator 4. The gases exit through the inner jacket tube 5 from the particle separator to the next stage in the process, which is not described more closely in this connection, because the feasible alternatives are obvious to a man skilled in the art. The solid material returns through the outer jacket tube 6 and along the inner part of the return duct 6a vertically downwards to the gas lock structure KL in the lower part of the reactor chamber R, through which they return to the fluidized bed above the grate structure 10 in the reactor chamber R.

Figure 2:
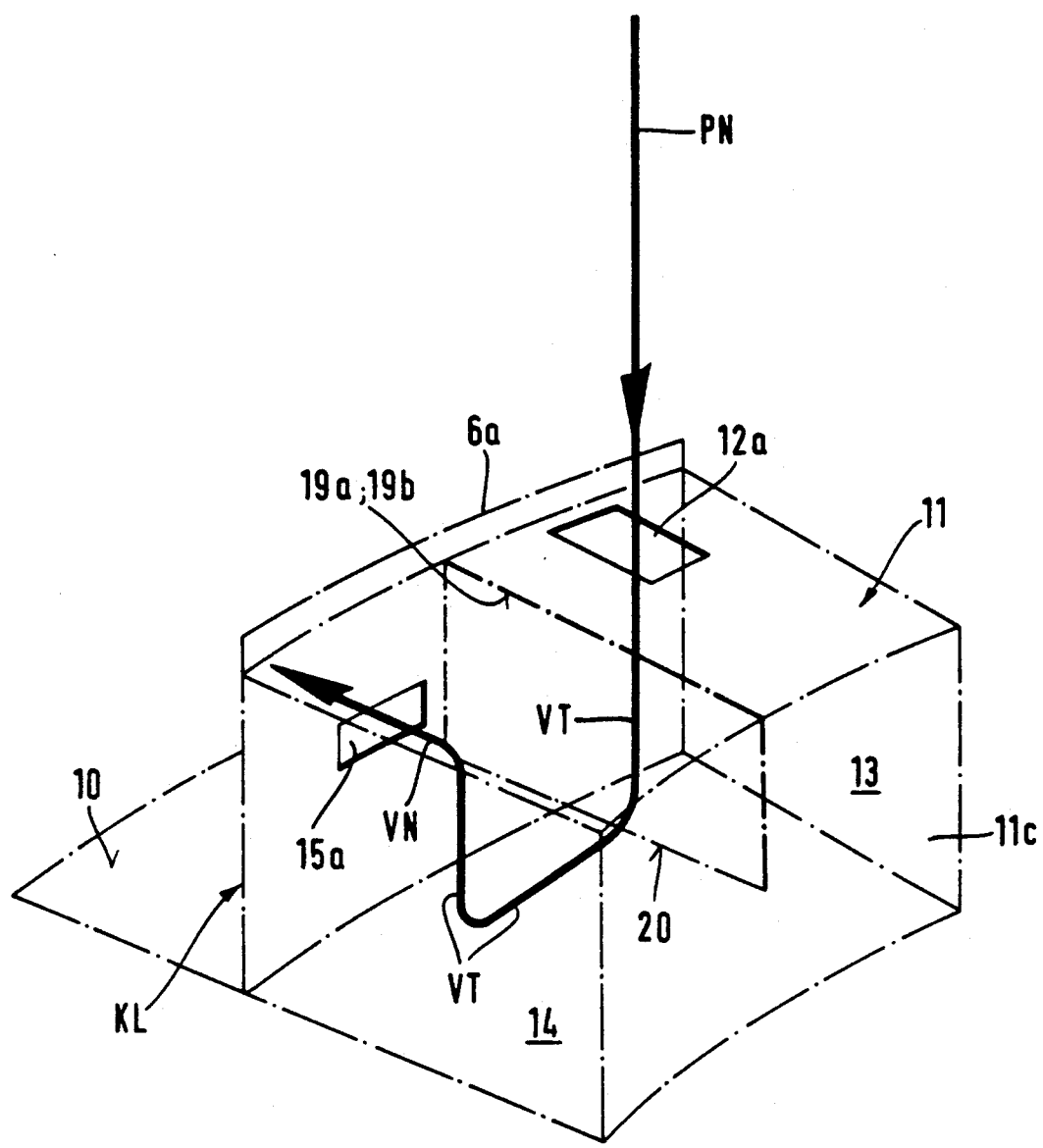
FIG. 2 shows schematically the flow of solid material through the gas lock structure according to FIG. 1.

The main principle of the gas lock structure according to the present invention is shown in FIG. 2. The solid material returns within the return duct 6a to the lower part of the reactor chamber, as shown by the vertical arrow section PN, and at the first stage, the flow of solid material confronts the cover structure 11 of the gas lock arrangement having an open area, whereby the solid material traverses the open area of the cover structure to the interspace 13. In FIG. 2, only one opening 12a of the open area is shown as an example. In vertical direction, the interspace 13 is limited by the closed bottom structure 14 of the gas lock structure, which is located underneath the cover structure 11 and at the level of the grate structure 10, as seen in horizontal direction. The return duct 6a which is formed as an extension of the outer jacket tube 6 comprises an open area situated between the cover structure 11 and the bottom structure 14, as seen in vertical direction. FIG. 2 shows as an example one opening 15a, through which the solid material exits from the interspace 13 to the fluidized bed above the grate structure 10, as shown by arrow VN, in essentially horizontal direction after at least one change of direction occurring in the interspace 13. In the annular embodiment of the gas lock structure, the cover structure 11 and the bottom structure 14 are connected by a partition wall structure 11c which can, as will be explained further on, be essentially formed of a bent structure of a plurality of tubes containing heat transfer medium. The partition wall structure 11c faces essentially the center of the return duct 6a by situating in its longitudinal direction.

Especially FIGS. 3 and 4 show a practical embodiment of the principle of FIG. 2 in a larger scale. First of all, in the embodiment as presented in FIG. 3, air distributing boxes 25 or corresponding structures are arranged underneath the grate structure 10 as well as underneath the closed bottom structure 14 of the gas lock structure KL. Openings 25a, of the air distributing boxes through connectors 25b are connected to air supply means 25c. Air blow nozzle systems 16 and 17 are arranged in the grate structure 10 and in the closed bottom structure 14, respectively. Such an air blow system is, at least for the grate structure, known from the prior art, so that it is not described in greater detail in this connection. It is clear that the air blow system is new as applied in connection with the gas lock structure, although it can, in essential parts thereof, be constructed in a way similar to the air blow system of the grate structure.

As is apparent especially from FIG. 4, the gas lock structure KL is located as an annular part concentric with the joint vertical center line K of the return duct 6a and the outer wall structure 1 of the reactor chamber R, so that the imaginary center of the gas lock structure coincides with the center line K.

In the shown embodiment, the gas lock structure is partially formed of a plurality of tubes that contains heat transfer medium using bending and welding techniques. The structure made of tubes extends from the gas lock structure KL of FIGS. 3 and 4 upwards as the return duct 6a, in the upper part of which the structure of tubes extends further as the outer jacket tube 6 of the particle separator.

In the embodiment shown in FIGS. 3 and 4, part of the tubes forming the wall of the return duct 6a are bent by groups towards the inside of the return duct to form parts 11a of the cover structure directed obliquely downwards to the center of the return duct 6a. In FIGS. 3 and 4, the parts 11a of the cover structure (six in total number) are formed of six parallel tubes that are bent in the same U-form that opens in the horizontal direction towards the wall 1 of the reactor chamber R. In addition to the parts 11a of the cover structure (upper side of the U-form), the tubes form part of the bottom structure 14 of the gas lock structure at their parts 11b (lower side of the U-form) that, beginning from the end bending 11c (bottom of the U-form) directed to the center line K and forming the partition wall structure, extend to the distributing chamber 8 essentially in the horizontal direction underneath the part 11a of the cover structure. Thus, an open area 15 is formed on the wall of the return duct 6a at the location of the said tube bendings forming the cover structure 11 of the gas lock structure KL and partly the bottom structure 14. The number of single openings 15a in the open area 15 depends on how many groups of tubes are bent in the lower part of the return duct 6a to the direction of the centre line K of the return duct 6a. The open area 12 of the cover structure 11 is formed of the openings 12a having essentially the form of a triangle or a sector that are left between the said bent parts 11a of the cover structure joined at their edges on the side of the centre line K. The openings 12a extend to the wall of the return duct 6a, and the wall of the return duct 6a extends as closed structure at the location of the openings 12a down to the level of the bottom structure 14, that is in the presented embodiment all the way to the distributing chamber 8. The lower edge of each of the openings 15a in the open area 15 formed in the wall of the return duct 6a is elevated from the level of the bottom structure 14 by a partition wall 18, formed at the site of the distribution chamber 8, that is preferably a structure formed of the tubular parts bent according to FIG. 3 that contain heat transfer medium and are in a heat transfer medium transferring connection with the distributing chamber 8 and lie parallelly welded together. The outer surface of the structure is on both vertical sides provided with protective brickwork, for example. Correspondingly, on both sides of the parts 11a of the cover structure extending essentially in the radial direction there are placed vertical guard walls 19a, 19b so that their horizontal lower edge 20 is located below the upper edge of the said partition wall 18. The guard walls 19a, 19b have essentially the form of a triangle, whereby their oblique edge 21 is fixed to the part 11a of the cover structure to extend parallelly with the side edges thereof, and the vertical edge 22 is similarly fixed to the vertical edge of the respective opening 15a, as can be seen in FIGS. 3 and 4. In FIG. 2, the placement of the guard walls is shown by dash-and-dot lines and their effect on the change in the direction of flow of the solid matter is shown in the section VT between the arrows PN and VN, whereby the solid matter is transferred in a U-form in the interspace 13.

The bottom structure 14 is, in the parts between the above-mentioned bended tubular sections 11b, a welded plate structure. The air blow nozzle system 17 essentially extends to the whole area of the bottom structure 14. Thus, the air blow system 17 partly fluidizes the solid material, which is gradually transferred from the interspace 13 through the open area 15 to the fluidized bed above the grate structure 10. The minimum height of the solid material in the interspace 13 is denoted in FIG. 3 by the reference numeral 26. As illustrated in FIG. 3, the minimum height is located above the lower edge 20 of the guard walls 19a, 19b.

The center part of the return duct 6a is formed by a horizontal plate structure 23 or the like, through which the service or maintenance of the gas lock structure and the return duct 6a, as well as naturally the discharge of solid material from the combustion unit, can be arranged. It is clear that the gaps at the edges between the end bendings 11c belonging to adjacent parts 11a of the cover structure are sealed, for example, by suitable welded structural parts and/or by a protective brickwork.

It is clear that for example, the structure of FIGS. 3 and 4 can be accomplished so that there are two, three, four and the like parts 11a of the cover structure having essentially a rectangular form seen in the longitudinal direction of the return duct 6a and being arranged preferably in equal form and at equal distances on the whole periphery of the return duct 6a. In most applications in practice, it is advantageous to construct the cover structure 11 and the bottom structure 14 of a plurality of tubes containing heat transfer medium, as described above; however, this is not necessary, but also an uncooled gas lock structure is possible with certain provisions, for example as a plate or sheet structure provided with a protective brickwork or the like.

Further, it is not necessary that the cover structure 11 and its open areas 12 and 15 have the form of that described above, but also other forms or configurations are applicable.

I claim:

1. A combustion unit, which for effecting a circulating mass process includes a reactor chamber, whose lower part is, for formation of a fluidized bed, fitted with a grate structure, said reactor chamber having means for feeding fuel above the grate structure and means for feeding air above the grate structure into the fluidized bed; at least one particle separator with means for purifying the combustion gas containing solid material, formed in the fluidized bed, from said solid material; a return duct for returning the solid material particularly to the fluidized bed; and a gas lock structure connected with the return duct to form an extension thereof for preventing the gas flow from the grate structure to the particle separator that tends to occur under certain process conditions, wherein said gas lock structure comprises:

a closed bottom structure;

a cover structure placed above the bottom structure and equipped with an open area;

an interspace formed between the bottom structure and the cover structure; and an open area placed in the wall of the return duct between the bottom structure and the cover structure, as seen in vertical direction, and connected with the interspace, and whereby the solid material is arranged to move from the return duct through the open area of the cover structure to the interspace and to exit from the interspace to the fluidized bed above the grate structure through the open area of the return duct.

2. A combustion unit for effecting a circulating mass process, comprising:

a reactor chamber placed in a substantially vertical position and having wall structure at least in the vertical direction arranged as a substantially tubular heat transfer surface, whereby a flow of heat transfer medium is arranged inside the tubular structure and heat-producing combustion is arranged to occur above a grate structure situated in the lower part of the reactor chamber by means of supply of fuel and air, and wherein the developing combustion gases containing solid material flow upwards in the reactor chamber; at least one particle separator, a cyclone separator, arranged inside the upper part of the reactor chamber, said cyclone separator having two tubular jackets placed substantially within each other and whose center lines are arranged to substantially coincide and to be vertical, whereby a first outer tubular jacket is fitted with an inlet arrangement for the combustion gas, and a return duct for returning the solid material separated from the combustion gas in the particle separator to the lower part of the reactor chamber is arranged in the lower part of said first outer jacket with open ends is at its upper part connected to a process stage after the combustion unit to transfer the combustion gas substantially free from solid material through said second inner jacket to said process stage after the combustion unit; and a gas lock structure arranged in connection with the return duct of the solid material as an extension thereof, said gas lock structure comprising:

a closed bottom structure;

a cover structure placed above the bottom structure and equipped with an open area;

an interspace formed between the bottom structure and the cover structure; and an open area placed in the wall of the return duct between the bottom structure and the cover structure, as seen in vertical direction, and connected with the interspace, and whereby the solid material is arranged to move from the return duct through the open area of the cover structure to the interspace and to exit from the interspace to the fluidized bed above the grate structure through the open area of the return duct.

3. Combustion unit according to claim 1 wherein the open areas are formed of openings alternating in the direction of the periphery of the return duct such that at the location of the openings of the open area of the cover structure, the wall of the return duct is closed, and at the location of the parts forming the cover structure, the openings of the open area in the wall of the return duct are situated below the parts of the cover structure.

4. Combustion unit according to claim 1, wherein the bottom structure is placed substantially at the level of the grate structure, as seen in the horizontal direction.

5. Combustion unit according to claim 1, wherein the gas lock structure is formed as an annular part connected at its outer edge to the wall of the return duct and extending towards the center line of the return duct.

6. Combustion unit according to claim 5, wherein the cover structure and the bottom structure are connected to each other by a partition wall structure on the side of said annular part that faces the center line of the return duct.

7. Combustion unit according to claim 1, wherein in connection with the cover structure there are provided members directed to the interspace in the vertical direction, whose lower edges are placed between the open areas so that a horizontal transition from the open area of the cover structure to the open area of the return duct is prevented and that the solid material is urged to pass in the interspace under the members directed to the interspace.

8. Combustion unit according to claim 1, wherein means for effecting air blow in the interspace are arranged in the interspace formed between the bottom structure and the cover structure.

9. Combustion unit according to claim 1, wherein the open area in the wall of the return duct is formed in such a way that its lower edge is above the substantially horizontal main plane of the bottom structure.

10. Combustion unit according to claim 1, wherein the cover structure is formed of parts of the cover structure placed at a distance from each other in the direction of the periphery of the return duct, wherebetween the open area consisting substantially of sector zones is formed.

11. Combustion unit according to claim 1, wherein the cover structure is connected to a tubular structure of the return duct containing heat transfer medium in such a way that the cover structure includes at least two parts of the cover structure formed of at least two parallel tubes directed towards the center line of the return duct, at least partly slanting downwards, whereby the part of the cover structure bounds the upper edge of the opening located below it in the return duct.

12. Combustion unit according to claim 7, wherein vertical guard walls are arranged on the longitudinal sides of the parts of the cover structure, the lower edges of the walls being situated in the vertical direction below the lower edge of the respective opening, as seen in the vertical direction, and the vertical sides of the walls being situated on the vertical edges of the respective opening.

13. Combustion unit according to claim 11, wherein the part of the cover structure consisting of parallel tubes extends as an end bending directed to the center line and forming part of the partition wall structure, and therefrom further, as a part forming part of the bottom structure and situated underneath the part of the cover structure, to the annular distributing chamber placed between the grate structure and the bottom structure.

14. Combustion unit according to claim 11, wherein, in connection with the openings of the return duct a partition wall is formed, which is connected at the level of the bottom structure, to the distributing chamber, contains heat transfer medium, and is fitted with a protective brickwork on its side surfaces, whereby the partition wall limits by its upper edge the lower edge of the openings of the return duct.

* * * * *